United States Patent [19]

Cordova et al.

[11] Patent Number: 4,767,646

[45] Date of Patent: Aug. 30, 1988

[54] WET ABRASION RESISTANT YARN AND CORDAGE

[75] Inventors: Colleen W. Cordova, Midlothian; Robert M. Marshall, Chester, both of Va.

[73] Assignee: Allied Corporation, Morris Township, Morris County, N.J.

[21] Appl. No.: 791,007

[22] Filed: Oct. 24, 1985

[51] Int. Cl.$^4$ ............................................. B32B 9/00
[52] U.S. Cl. .................................. 427/387; 427/389.9; 428/375; 428/391; 428/392; 428/394; 428/395; 57/241; 57/242; 57/258; 57/251; 252/8.6; 252/8.8; 524/720; 524/838
[58] Field of Search .............. 428/391, 395, 394, 392, 428/375; 252/8.8, 8.6; 57/241, 242, 258, 250, 251, 902; 427/387, 389.9

[56] References Cited

U.S. PATENT DOCUMENTS

| | | | |
|---|---|---|---|
| 3,060,163 | 10/1962 | Erchak, Jr. ........................ | 260/94.9 |
| 3,103,448 | 9/1963 | Ross ................................... | 117/139.5 |
| 3,155,537 | 11/1964 | Patterson et al. ................ | 117/138.8 |
| 3,844,826 | 10/1974 | Buchner et al. ............... | 117/138.8 F |
| 3,850,658 | 11/1974 | Gomez et al. ...................... | 252/8.8 |
| 3,853,607 | 12/1974 | Iyengar et al. ....................... | 252/8.6 |
| 3,917,893 | 11/1975 | Marshall et al. .................... | 428/395 |
| 3,983,272 | 9/1976 | Huber et al. ..................... | 427/407 R |
| 4,129,507 | 12/1978 | Marshall et al. .................... | 428/395 |
| 4,293,460 | 10/1981 | Marshall et al. ..................... | 252/8.6 |
| 4,367,151 | 1/1983 | Kinsman et al. ..................... | 252/8.8 |
| 4,371,658 | 2/1983 | Marshall et al. ..................... | 252/8.6 |
| 4,390,591 | 6/1983 | Marshall et al. ..................... | 428/391 |
| 4,394,518 | 7/1983 | Huber et al. ......................... | 556/424 |
| 4,397,985 | 8/1983 | Marshall et al. ..................... | 428/391 |
| 4,455,341 | 6/1984 | Harteman ........................... | 428/395 |
| 4,585,563 | 4/1986 | Busch et al. .......................... | 52/8.8 |

FOREIGN PATENT DOCUMENTS 208464 12/1983 Japan .................................. 252/8.8

Primary Examiner—Sharon A. Gibson
Attorney, Agent, or Firm—William H. Thrower

[57] ABSTRACT

Aqueous overfinish compositions, yarns treated therewith, and methods of producing wet abrasion resistant cordage from the yarn are all disclosed. One of the compositions includes an oxidized polyethylene emulsified with a non-nitrogen, nonionic emulsifier and neutralized with an alkali hydroxide, and a compound selected from the group consisting of a siloxane of the comonomers dimethyl and 3-[(2-aminoethyl)aminopropyl], and an amide melamine wax. An alternate finish composition comprises an oxidized polyethylene, neutralized with ammonium hydroxide and emulsified with a non-nitrogen, nonionic emulsifier. Yarn treated with this alternate finish has enhanced wet abrasion resistance. Yarns of this invention are ideally suited for heavy ropes and other industrial cordage applications where wet and dry abrasion resistance and strength are desirable.

19 Claims, 1 Drawing Sheet

WET ABRASION RESISTANT YARN AND CORDAGE

BACKGROUND OF THE INVENTION

1. Field of the Invention

The present invention relates to aqueous overfinish compositions, yarns treated therewith and methods of producing wet abrasion resistant cordage from the yarn. More specifically, the present invention relates to aqueous overfinishes for application to yarns of polyamide, polyester or polyolefin to improve wet and dry abrasion resistance thereof as well as that of cordage made therefrom.

2. Description of the Prior Art

Cordage products designed for prolonged contact with water need to have wet abrasion resistance. This invention is directed to enhancing wet abrasion resistance for cordage made from natural and/or synthetic fibers. The general term yarn is used herein to include mono- and multifilaments, fiber, thread, yarn or other similar forms. Preferred are synthetic continuous filaments.

Cords or ropes fabricated of the yarns treated in accordance with the teachings of U.S. Pat. No. 3,103,448 to Ross are more resistant to wet and dry chafing abrasion. Drawn or undrawn synthetic continuous filament yarns, especially nylon, are treated with an aqueous emulsion of an oxidized polyethylene (See U.S. Pat. No. 3,060,163 to Erchak, Jr.). Further, the coatings of oxidized polyethylene may be applied alone or with other finish additives, e.g. silicones (column 3, lines 9–31).

Spin finishes for polyamide yarn which include an oxidized polyethylene are disclosed in U.S. Pat. Nos. 3,917,893, 4,129,507, 4,293,460 and 4,371,658, all to Marshall et al. An overfinish for polyester yarn which includes an oxidized polyethylene is disclosed in U.S. Pat. No. 3,850,658 to Gomez et al.

Enhanced adhesion and fatigue resistance for polyester and polyamide tire and industrial yarns are achieved according to U.S. Pat. No. 3,853,607 to Iyengar et al. via treatment with a lubricating finish composed of a polyorganosiloxane oil and a polyalkylene wax or a microcrystalline wax dispersed in a dialkylphthalate oil. Known dressing agents (lubricants) for sewing threads are polydiorganosiloxane oils or a mixture of these oils and polyethylene waxes, according to U.S. Pat. No. 3,844,826 to Buchner et al., and U.S. Pat. No. 4,394,518 to Huber et al. states (column 3) that organosilicone compounds of that invention can be applied in admixture with other substances previously used to improve slipping or gliding properties of organic fiber, e.g. paraffin and/or polyethylene waxes. Similarly, U.S. Pat. No. 3,983,272 to Huber et al. teaches improved lubricity or gliding ability of fibers by coating with a composition containing a diorganopolysiloxane, a phosphorus compound and paraffin waxes. All of the prior art patents mentioned above are hereby incorporated by reference.

None of the prior art teaches the required combination of ingredients to achieve the specific beneficial results of the finishes of this invention. More specifically, although it is known to use coatings of oxidized polyethylene on yarn to improve wet and dry chafing abrasion, solids retention on the yarn (an indicator of durability of the coating) after prolonged exposure to water has been unsatisfactory with some of these coatings, and the wet abrasion resistance has not always translated to rope made of the yarn.

SUMMARY OF THE INVENTION

In accordance with this invention, there is provided an aqueous overfinish for application to a yarn, preferably synthetic, comprising an oxidized polyethylene, neutralized with ammonium hydroxide and emulsified with a non-nitrogen, nonionic emulsifier. Also in accordance with this invention, there are provided yarns treated with the aforementioned composition and method of producing a wet abrasion resistant cordage therefrom.

Further, in accordance with this invention, there is provided a method of producing a wet abrasion resistant cordage from yarn comprising treating the yarn, after drawing, with an effective amount of an aqueous overfinish composition having an oil portion which comprises about 20 to 80 weight percent of an oxidized polyethylene emulsified with a non-nitrogen, nonionic emulsifier and neutralized with an alkali hydroxide; and about 80 to 20 weight percent of a compound selected from the group consisting of a siloxane of the comonomers dimethyl and 3-[(2-aminoethyl)-aminopropyl], and an amide melamine wax.

The synthetic yarns of the present invention preferably are chosen from the group of polyesters, polyamides and polyolefins. However, any yarn for heavy duty cordage end use where the yarn (in rope/cord form) will get wet and need both wet abrasion resistance and strength is comtemplated, e.g., towing, anchoring, hawsers, deep sea moorings, weighted net lines, marine usages.

The preferred polyesters are the linear terephthalate polyesters, i.e., polyesters of a glycol containing from 2 to 20 carbon atoms and a dicarboxylic acid component containing at least about 75 percent, more preferably 90 percent terephthalic acid. The remainder, if any, of the dicarboxylic acid component may be any suitable dicarboxylic acid such as sebacic acid, adipic acid, isophthalic acid, sulfonyl-4,4'dibenzoic acid, 2,8-dibenzofuran-dicarboxylic acid, or 2,6-naphthalene dicarboxylic acid. The glycols may contain more than two carbon atoms in the chain, e.g., diethylene glycol, butylene glycol, decamethylene glycol, and bis-(1,4-hydroxymethyl)cyclohexane. The most preferred linear terephthalate polyester is poly(ethylene terephthalate).

Suitable polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodecanedioic acid, or by polymerization of 6-caprolactam, 7-aminoheptanoic acid, 8-caprolactam, 9-aminopelargonic acid, 11-aminoundecanoic acid, and 12-dodecalactam known as nylon 6, nylon 7, nylon 8, nylon 9, nylon 11, and nylon 12, respectively. Other suitable polyamides include the aramids. The most preferred polyamide is nylon 6.

Suitable polyolefins include, for example, polyethylene homopolymer, polypropylene homopolymer, a polyethylene copolymer, and a polypropylene copolymer. The polyethylene copolymer has at least 90 percent ethylene units and the remainder of the copolymer is a diluent such as propylene or butylene. The polypropylene copolymer has at least 90 percent propylene units and the remainder of the copolymer is a diluent such as ethylene or butylene. Most preferred is the polyethylene homopolymer, commercially available from Allied Corporation as SPECTRA-900 or SPECTRA-1000.

The siloxane of the present invention is commercially available from Henkel Corporation as Repellan 80, a siloxane of the comonomers dimethyl and 3-[(2-aminoethyl)aminopropyl].

The amide melamine wax is formed by reacting melamine with a $C_6$ to $C_{36}$, more preferably $C_{10}$ to $C_{18}$, fatty acid to form a hydrophobic amide which is emulsified with paraffin wax using nonionic emulsifiers; Repelotex HM, commercially available from Lyndal Chemical, is the wax of choice.

The oxidized polyethylenes utilized in the present invention are low molecular weight polyethylene homopolymers which have an average molecular weight of less than about 5000. The average molecular weight is the number average molecular weight determined by vapor phase osmometry using phenetol as solvent. Preferably, the number average molecular weight is about 1000 to 4000 and most preferably about 1500 to 2500. These polyethylenes have preferably been oxidized to an acid number of about 10 to 35, more preferably about 12 to 28 and most preferably about 13 to 17. These oxidized polyethylenes preferably have a softening point as determined by ASTM E-28 of about 85° to 145° C., more preferably about 95° to 140° C. and most preferably about 98° to 115° C. Preferably, such oxidized polyethylenes have a Brookfield viscosity at 140° C. (284° F.) of about 120 to 300 centipoises (hereafter cps) and most preferably about 170 to 250 cps. Such oxidized polyethylenes are commercially available, for example, from Allied Corporation as A-C ® polyethylene type 680 and 392, the latter having Brookfield viscosity at 149° C. (300° F.) of 9000 cps.

The oxidized polyethylenes useful in this invention may be obtained by oxidizing low molecular weight polyethylenes with air or oxygen by conventional procedures. See, for example, U.S. Pat. Nos. 3,060,163 to Erchak, Jr., and 3,322,711 to Bush et al., as well as Canadian Pat. No. 854 778, all of which are hereby incorporated by reference.

Any suitable non-nitrogen, nonionic emulsifying agent may be used in emulsifying the oxidized polyethylenes used in the present invention. Mixtures of higher fatty acids, for example, $C_{12}$ to $C_{20}$ saturated aliphatic acids, may be used as emulsifiers as may also the alkylaryl polyether alcohols. Especially useful are the condensation products of ethylene oxide with hydrophobic material such as long chain aliphatic alcohol, acid, ester, ether or alkyl phenol. These products are characterized by containing as the hydrophilic portion of the molecule, a plurality of oxyethylene moieties as illustrated in the formulae below:

1. $R-O-(CH_2-CH_2O)_x-CH_2-CH_2OH$ wherein R is an alkyl group having from 12 to 22 carbon atoms or an alkyl phenol residue wherein the alkyl group contains from 6 to 13 carbon atoms inclusive and wherein X is at least 4, especially between about 6 and about 40. Commercial examples of products in this group include "Triton X-100" wherein R is an alkyl phenol residue wherein the alkyl group is isooctyl and wherein X is 7 to 9; "Triton X-102" wherein R is an isooctyl phenol residue and X is 11; "Tergitol NPX" wherein R is ethylhexyl phenol residue and X is 8 to 9; "Neutronic 600" wherein R is nonyl phenol residue and X is 9; "Emulphor ELN" wherein R is dodecyl phenol residue and X is 19.

2. Condensation products of fatty acids in polyethylene glycols having the general formula:

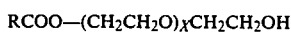
$RCOO-(CH_2CH_2O)_xCH_2CH_2OH$ wherein R is a long chain alkyl group having from 12 to 18 carbon atoms inclusive and X is an integer from 8 to 40 inclusive.

3. Polyoxyethylene derivatives of hexitol anhydride or sorbitol fatty acid esters such as "Tween 80".

4. Polyoxyethylene ethers

$R-O(CH_2CH_2O)_xCH_2CH_2OH$ wherein R is an alkyl group having from 6 to 18 carbon atoms and X is an integer from 4 to 40 inclusive. The preferred emulsifiers are the alkyl phenols, most especially Triton X-100.

Alkali hydroxides suitable for use in the composition which includes the siloxane or amide melamine wax include sodium hydroxide, potassium hydroxide and ammonium hydroxide. The alkali hydroxide, preferably in solution, neutralizes the acid function of the polymer, i.e., the oxidized polyethylene, and is critical in making the polyethylene emulsion and consequently, the finish.

In the alternate finish composition, ammonium hydroxide is critical in achieving enhanced wet abrasion resistance. In accordance with this invention, solids or finish retention of greater than 50 percent is achieved after prolonged exposure of the yarn to water, and dry and wet abrasion (tests defined hereafter) in excess of 200 and 100 cycles, respectively, can be achieved.

In the aqueous overfinish which includes the oxidized polyethylene and the compound (either the siloxane or amide melamine wax) it is preferred that the relative amounts of these compounds be about the same. At least about 0.25 weight percent of each of these on the yarn has been found necessary to achieve the beneficial results discussed. The aqueous finish composition comprising an oxidized polyethylene neutralized with ammonium hydroxide requires a minimum of 0.25 weight percent oxidized polyethylene on yarn; more preferably at least about 0.50 weight percent oxidized polyethylene on the weight of the yarn is put on the yarn.

DESCRIPTION OF THE PREFERRED EMBODIMENT

Figure 1:
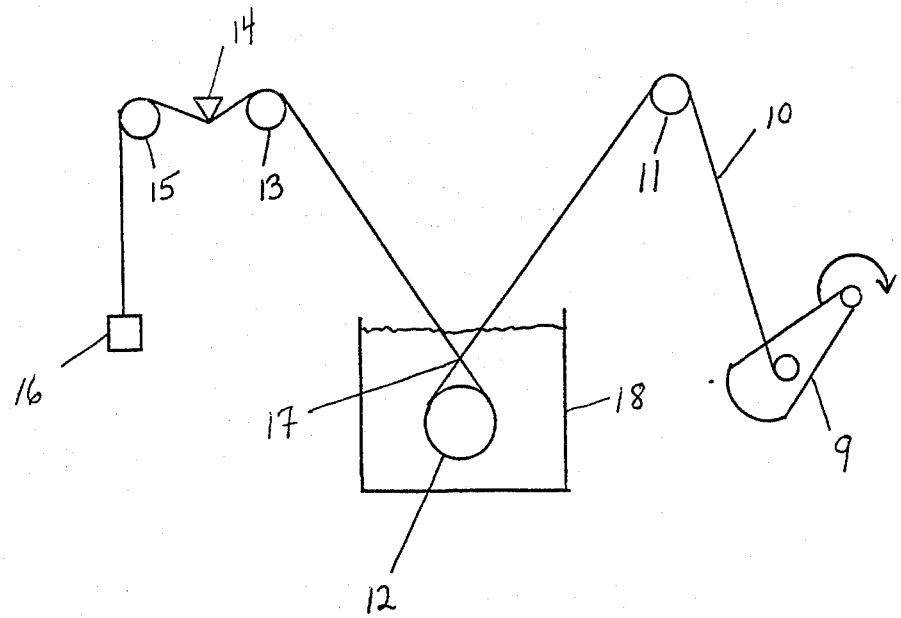
FIG. 1 is a front view of apparatus used in testing yarn to yarn wet and dry abrasion.

The preferred embodiment of this invention may be briefly stated as follows:

An overfinish, particularly for continuous filament polyamide yarn to be processed into industrial cord, the finish being an oil in water emulsion of about 15 to 30 percent by weight of the oil portion, the oil portion comprising about 20 to 80, most preferably 50, weight percent of an oxidized polyethylene having an acid number of about 13 to 17 and a softening point of about 98° to 115° C., emulsified with a non-nitrogen nonionic emulsifier, preferably POE (9–10) nonyl phenol, and neutralized with sodium or potassium hydroxide; and about 80 to 20, most preferably 50, weight percent of a compound selected from the group consisting of a siloxane of the comonomers dimethyl and 3-[(2-aminoethyl- )aminopropyl], and an amide melamine wax formed by reacting melamine with a $C_6$ to $C_{36}$, preferably $C_{10}$ to $C_{18}$, fatty acid to form a hydrophobic amide which is emulsified with paraffin wax using nonionic emulsifiers. An alternate but equally preferred embodiment of the invention is briefly stated as follows: a finish for enhanced solids retention and wet abrasion resistance, particularly for continuous filament polyamide yarn to be processed into cordage products, the finish being an oil in water emulsion of about 15 to 30 percent by weight of the oil portion, the oil portion comprising an oxidized polyethylene having an acid number of about 13 to 17 and softening point of about 98° to 115° C., neutralized with ammonium hydroxide and emulsified with a non-nitrogen, nonionic emulsifier such as POE (9-10) nonyl phenol.

The oxidized polyethylene wax as described may be emulsified in water by known methods using any suitable emulsifying agent as set forth above. Reference may be had to U.S. Pat. Nos. 3,850,658 to Gomez et al. and 4,371,658 to Marshall et al., both of which are hereby incorporated by reference, for methods of preparing aqueous emulsions of the oxidized polyethylenes.

In the examples, the commercially available polyethylene emulsions are diluted with water followed by blending with the other commercially available emulsion, all at room temperature, to achieve the desired percent solids. Concentrations of between about 2 and 40 percent solids are suitable, and between about 5 and 15 percent are preferred.

The finish is applied to the yarn in any of the conventional manners. A satisfactory way of applying the coating is by feeding the emulsion to a trough equipped with a rotatable roll dipping therein; the yarn contacts this roll at a relative speed with respect to the rate of rotation of the roll adjusted to provide the desired pickup of coating by the yarn, for example, between about 3 and 8 percent pickup of the liquid coating by weight based on the weight of the yarn.

The quantities of solids on yarn desired, i.e. between about 0.25 and 0.80 percent by weight of the finished yarn, is sufficiently large that the solids need to be put on in an overfinish rather than spin finish.

The tests for yarn to yarn dry abrasion, yarn to yarn wet abrasion and yarn to metal wet abrasion are set forth as follows:

1. YARN TO YARN (Y/Y) DRY ABRASION TEST

With reference to FIG. 1, a one meter length of yarn 10 is tied eccentrically at one end to a cycling wheel 9. Its other end is passed over a first free-wheeling yarn guide 11 and under a pulley 12, thence over a second free-wheeling yarn guide 13, under a cut off device 14 and finally over a third free-wheeling yarn guide 15. At its extreme, a weight 16 is tied onto the yarn. The yarn is looped prior to its being placed around pulley 12 to create twist point 17. The cycling wheel 9 is turned on to rotate clockwise; the yarn alternately is pulled toward the cycling wheel 9 and towards the weight 16 to exert an abrading action on the yarn itself at the point of twist 17 above the pulley 12. The results are reported in cycles to break; the larger the number, the better the dry abrasion resistance. In Examples 1-23, weight 16 is equal to the nylon yarn denier of 1260. In Examples 42-46, weight 16 is as specified in Table 6.

2. YARN TO YARN (Y/Y) WET ABRASION TEST

This test is identical to the dry abrasion test except that pulley 12 with yarn 10 looped thereabout and twist point 17 are submerged in water in container 18. Results are also reported in cycles to break with the larger numbers being indicative of better wet abrasion resistance.

3. YARN TO METAL (Y/M) WET ABRASION TEST

Figure 2:
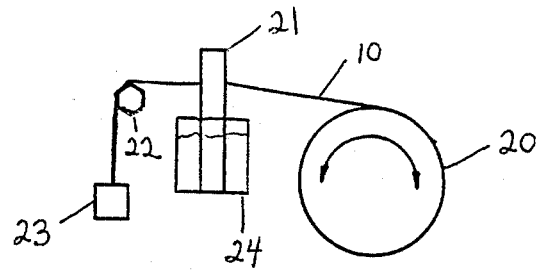
FIG. 2 is a side view of apparatus utilized to test yarn to metal wet abrasion.

Breaking strength is measured as taught by ASTM D-885-81, hereby incorporated by reference, with a 10-inch (25 cm) gage, 12-inch (30 cm) crosshead and 0 chartspeed (no stress strain curve). With reference to FIG. 2, a length of yarn 10 (about 1 meter) is taped at one end to the surface of a cycling drum 20. Its other end is passed partially along the circumference of drum 20, through sponge 21, and over a stainless steel hexagonal bar 22 having a diameter of 0.25 inch (0.64 cm). At its extreme, a weight 23 is tied onto yarn 10. In Examples 29-33, weight 23 is 150 grams. Sponge 21, which sits in a canister 24 of water, is partially slit from its top to an aperture (above the top of canister) through which yarn 10 passes. Drum 20 is caused to move back and forth in the direction of yarn travel enough to cause approximately 12 to 14 inches (30-35 cm) of yarn 10 to be dragged back and forth over hexagonal bar 22 2500 times/cycles. As yarn 10 passes through sponge 21 during cycling, it is wettened and wiped. After yarn 10 dries, its breaking strength is again measured in accordance with ASTM D-885-81 above. The breaking strength retention in percent is determined and is set forth in Table 4 as the yarn to metal wet abrasion. This figure is arrived at by taking the difference between the breaking strengths before and after cycling, dividing the difference by the breaking strength before cycling, and multiplying the resulting number by 100.

The yarns of this invention are especially adapted for fabrication into ropes of unusually high strength by well known commercial processes. Ropes are prepared from such yarns by a multistage process, the steps of which may vary somewhat depending on the type of rope desired. For testing purposes, the ropes are prepared as follows:

The rope has a diameter of about 0.5 inch (1.3 cm) and comprises a braided core with a braided cover (Parallay ® braid of Samson). The core is made of 1260 denier—6 ply, 2 ends per carrier, 20 strand braider, at 4.557 ppi (picks per inch), 3.072 pounds/100 feet (target). The cover is made of 1260 denier—12 ply, 2 ends per carrier, 8 strands by 2, 24 ends total, at 1.678 ppi, 3.421 pounds/100 feet (target). For testing, the rope is passed at an angle of 10° and under 1700 pound load over a curved bar and cycled [18 inch (46 cm) span] until the braid breaks, under both wet and dry conditions. Results are reported in cycles to break; the larger the number the better the abrasion resistance. With reference to Table 6, testing was done under quality control procedures of a customer-break and elongation testing were performed with reference to ASTM D-885 and linear density testing was performed with reference to ASTM 1907. The test equipment used for break and elongation testing was an Instron Model 1000.

The following specific examples further illustrate our invention. Parts are by weight except as otherwise noted.

EXAMPLES 1-23

1260 Denier polyamide yarn substantially as characterized in Example 1 of U.S. Pat. No. 4,293,460 to Marshall et al. was made using a coupled or continuous spin draw unit. The 24 percent oil in water emulsion was formed with the oil portion containing 55 percent rearranged glyceride, 25 percent POE (9) oleyl alcohol, 15 percent POE (5) castor oil, and 5 percent POE (9) nonyl phenol. The spin finish was applied to the yarn via a kiss roll at a wet pickup level which was sufficient to add 0.7 to 0.9 percent total spin finish on the weight of the fiber. In Example 1 (control), no overfinish was applied to the yarn. In Examples 2-23, the overfinishes designated in Table 1 were applied at a wet pickup sufficient to add on 0.5 percent solids on the weight of the yarn. Yarn to yarn wet and dry abrasion test results (6 tests per sample) and finish retention data (1 test per sample) are presented in Table 1. Particularly excellent results were obtained in Examples 7, 15 and 22 wherein yarn to yarn wet abrasion exceeded 140 cycles, yarn to yarn dry abrasion exceeded 300 cycles and finish retention exceeded 50 percent.

Note that when polyethylene emulsion alone is used as an overfinish (Examples 2, 3, 17, 19 and 22), the alkali hydroxide used to neutralize the acid function of the polymer is critical. In Examples 2 and 3 (sodium hydroxide neutralized), finish retention is significantly inferior to Example 22 (ammonium hydroxide neutralized), and wet abrasion resistance is inferior to the control for Example 2 and only marginally better in Example 3. Example 22 is significantly better than the control. Similarly, Examples 17 and 19 (potassium hydroxide neutralized) have significantly inferior finish retention as compared with Example 22 (ammonium hydroxide neutralized) as well as a wet abrasion resistance inferior to the control.

EXAMPLES 24-28

(Comparative)

1260 Denier polyamide yarn was made substantially in accordance with Example 1 of U.S. Pat. No. 4,293,460 to Marshall et al. The overfinishes set forth in Table 2 were utilized as spin finishes in Examples 24-28. The emulsions were 20 percent oil in water emulsions added via a kiss roll to achieve a wet pickup of 0.7 to 0.9 percent solids on yarn. It was then attempted to heat and dry the yarn on a conventional draw twist machine. Draw twist completes, in percent, were determined for each of Examples 24-28. The percent draw twist completes was unacceptably low for all except control Example 24, which had substantially less (about 0.1) oxidized polyethylene on the fiber being processed.

EXAMPLES 29-36

(Comparative)

Example 1 was repeated utilizing the following spin finish: 55 parts transesterified coconut oil-glycerol trioleate, 25 parts POE (9) oleyl alcohol, 15 parts POE (5) castor oil, 5 parts POE (9) nonyl phenol, and 3.75 parts oxidized polyethylene. The first four components were blended and emulsified. The oxidized polyethylene was emulsified separately and added to the finish emulsion. This is the spin finish of Example 29. For Examples 30-32, a 38 percent Repellan in water emulsion was then blended with the finish emulsion so that the Repellan represented from about 5 to 15 percent of the oil phase (to achieve about 0.05 to 0.15 percent Repellan on fiber as designated in Table 3, 24 percent oil in water emulsion). In Examples 33-35, the level of Repellan on yarn was held constant at 0.10 weight percent and the formulation varied to achieve the levels of polyethylene on yarn designated in Table 3. Test results for yarn to metal abrasion and yarn to yarn wet abrasion are presented in Table 3. Yarn test results were good.

In Example 36, an 840 denier polyamide yarn was formed. During formation, the yarn was treated with a spin finish comprising 1.58 percent Discosoft 567 (19 percent solids, Footnote 12, Table 1), 7.89 percent Repellan 80 (38 percent solids, Footnote 11, Table 1), 24 percent oil portion of Example 1 spin finish, and 66.53 percent water. Wet pickup was 5 percent to achieve 0.15 percent oxidized polyethylene on yarn and 0.03 percent siloxane on yarn. Excellent draw twist completes, in percent, were achieved (96 percent).

EXAMPLES 37-41

In Examples 37-41, 1260 denier yarn formed with the finish systems designated in Table 4 were made into rope (double braid construction) and tested for wet and dry breaking strength and retention, as well as wet and dry abrasion. Cordage made from yarn treated with the overfinishes of Examples 7, 15 and 22 (Examples 37, 38 and 39 here) had excellent wet and dry abrasion resistance, while cordage made from yarn treated with the spin finish of Example 36 (Example 41 here) had a significantly lower improvement in wet abrasion resistance when compared with the control of Example 40.

EXAMPLES 42-46

1000 Denier yarn was made substantially in accordance with Example 3 of U.S. Pat. No. 3,850,658 to Gomez et al. The spin finish of Table 5 was applied to the undrawn polyester yarn at a rate of approximately 0.5 percent to achieve 0.2 percent on fiber weight of the oil. After the drawing step, the overfinishes designated in Table 6 were applied in Examples 42-46, respectively. The yarn was tested for yarn to yarn wet and dry abrasion, yarn to metal wet abrasion, and finish retention. Results are set forth in Table 6. Yarn wet abrasion resistance and finish retention for Example 42 (sodium hydroxide neutralized oxidized polyethylene) were significantly inferior to Examples 44-46 of the present invention (note that Example 46 contains ammonium hydroxide neutralized oxidized polyethylene).

Although excellent abrasion resistance was achieved in Examples 43-46, the low finish retention of Example 43 leads one to suspect that the enhanced abrasion resistance of the yarn would not translate to a cordage product.

EXAMPLES 47-50

A 118 filament polyethylene yarn is prepared substantially by the method described in U.S. Pat. No. 4,413,110 to Kavesh et al., hereby incorporated by reference. In Examples 48-50, the overfinishes of Examples 7, 15 and 22, respectively, are applied with a wet pickup sufficient to achieve approximately 0.5 percent solids on fiber weight. It is anticipated that wet and dry abrasion resistance and finish retention will be significantly improved as compared with the control of Example 47.

TABLE 1
NYLON OVERFINISH DATA

| Example | Formulation[1] | Y/Y Abrasion, Cycles Wet | Y/Y Abrasion, Cycles Dry | Finish Retention, %[2] |
|---|---|---|---|---|
| 1 (control) | No overfinish | 29 | 246 | 22 |
| 2 | Polyethylene[3] emulsion | 15 | 452 | 27 |
| 3 | Polyethylene[4] emulsion | 36 | 452 | 20 |
| 4 | Paraffin wax[5] (melts at 54.4° C.) + zirconium acetate (4.5% of 39% solids dispersion) | 148 | 33 | — |
| 5 | Paraffin wax[5] (melts at 54.4° C.) | 165 | 196 | 27 |
| 6 | Amide melamine wax[6], 25% solids | 136 | 284 | 35 |
| *7 | Amide melamine wax[6], 25% solids + polyethylene emulsion[7] | 190 | 452 | 51 |
| 8 | Paraffin wax[8] (melts at 60° C.) + aluminum acetate (4-5%) | 107 | 452 | 35 |
| 9 | Paraffin wax[8] (melts at 60° C.) | 128 | 452 | 38 |
| 10 | Polyethylene, acrylic acid copolymer[9] | 8 | 452 | — |
| 11 | Polyethylene, acrylic acid copolymer[10] | 24 | 452 | — |
| 12 | Polypropylene wax | 28 | 42 | — |
| 13 | Paraffin wax[5] (melts at 54.4° C.) + polyethylene[3] | 155 | 7 | — |
| 14 | Example 4 formulation + polyethylene[3] | 127 | 3 | — |
| *15 | Siloxane[11] + polyethylene[12] blend | 144 | 304 | 97 |
| 16 | Dimethylpolysiloxane (350 cts viscosity) silicone oil emulsion | 6 | 2 | — |
| 17 | Polyethylene[13] emulsion | 12 | 165 | — |
| 18 | Blend of formulations of Examples 5 and 17 | 189 | 27 | — |
| 19 | Polyethylene[14] emulsion | 18 | 228 | — |
| 20 | Blend of formulations of Examples 5 and 19 | 153 | 3 | — |
| 21 | Dimethylpolysiloxane (50 cts viscosity, nonaqueous) | 5 | 2 | — |
| *22 | Polyethylene[7] emulsion | 149 | 452 | 91 |
| 23 | Emulsion with solids content: 55 parts transesterified coconut oil-glycerol trioleate; 25 parts POE (9) oleyl alcohol; 15 parts POE (5) castor oil; 5 parts POE (9) nonyl phenol; and 15 parts Discosoft 567[12] | 10 | 452 | — |

Footnotes

[1] All formulations 10% solids in water emulsions for application except Examples 21 (100%) and 23 (22%).

[2] After 1 hour scour. Use 20 g sample of overfinished yarn. Gravimetrically extract with cyclohexane to get level of finish on yarn. Submerge a new 20 g sample in room temperature (about 25 to 30° C.) water with constant stirring for 1 hour. Take out sample and allow to air dry. Do a gravimetrical extraction. Compare the first and second extractions as follows to determine finish retention:

$$\text{Finish Retention (\%)} = 100\% - \left[\left(\frac{\text{1st extraction} - \text{2nd extraction}}{\text{1st extraction}}\right)\right] \times 100$$

[3] A-C ® polyethylene 680, commercially available from Allied Corporation; oxidized polyethylene having an acid number of about 16 and a softening point of about 110° C.; neutralized with sodium hydroxide.

[4] A-C ® polyethylene 392, commercially available from Allied Corporation; oxidized polyethylene having an acid number of about 28 and a softening point of about 138° C.; neutralized with sodium hydroxide.

[5] Repelotex D, commercially available from Lyndal Chemical.

[6] Repelotex Hm, commercially available from Lyndal Chemical; melamine reacted with a long chain fatty acid (e.g., $C_{10}$ to $C_{18}$) to form a hydrophobic amide which is emulsified with paraffin wax using nonionic emulsifiers; 25% solids.

[7] Henkel CS-810, commercially available from Standard Chemical Products; $NH_4OH$ neutralized, 20% active in water; acid number and softening point similar to A-C ® polyethylene 680 in footnote 3.

[8] Discol 738, commercially available from Callaway Chemical Company.

[9] Ethylene copolymer 5120 commercially available from Allied Corporation; acid number about 120 and a softening point of about 92° C.

[10] Ethylene copolymer 540 commercially available from Allied Corporation; acid number of about 40 and a softening point of about 108° C.

[11] Repellan 80 commercially available from Henkel Coporation; 40% active emulsion; a siloxane of the comonomers dimethyl and 3-[(2-aminoethyl)amino propyl].

[12] Discosoft 567, commercially available from Callaway Chemical Company; 20% polyethylene emulsion, neutralized with sodium hydroxide; similar to A-C ® polyethylene 680 above.

[13] A-C ® polyethylene 316, commercially available from Allied Corporation; acid number of about 16 and a softening point of about 140° C.; neutralized with potassium hydroxide.

[14] A-C ® polyethylene 656 commercially available from Allied Corporation; acid number of about 15 and a softening point of about 100° C.; neutralized with potassium hydroxide.

*Examples of the present invention - all other comparative examples.

TABLE 2
NYLON SPIN FINISH DATA

| Example | Formulation[2] | % Completes[1] |
|---|---|---|
| 24 (control) | Same as Example 23 except 3.75 parts oxidized polyethylene | 94 |
| 25 | Overfinish of Example 15 | 31 |
| 26 | Overfinish of Example 7 | 24 |
| 27 | Overfinish of Example 22 | 18 |
| 28 | 50/50 Blend of overfinishes of Examples 24 and 25 | 38 |

[1] Drawtwist completes, %, determined as follows. Potential packages (PP) less the number of packages that did not start (NSP) less the number of packages that broke out (BOP), divided by the potential packages less the number of packages which did not start, all times 100 equals drawtwist completes in %.

$$\left(\frac{(PP - NSP) - BOP}{PP - NSP}\right) \times 100 = \% \text{ Completes}$$

[2] Target 0.7 to 0.9% solids on yarn.

TABLE 3
OTHER NYLON SPIN FINISH DATA

| Example | Repellan[1]/PE[2], %[3] | Y/M Abrasion[4], % | Y/Y Wet Abrasion[5], Cycles |
|---|---|---|---|
| 29 | 0.00/0.011 | 58.9 | 207 |
| 30 | 0.05/0.011 | 76.5 | 323 |
| 31 | 0.10/0.011 | 53.7 | 180 |
| 32 | 0.15/0.011 | 72.7 | 253 |
| 33 | 0.10/0.045 | 60.3 | 190 |
| 31 | 0.10/0.011 | 53.7 | 180 |
| 34 | 0.10/0.006 | 63.4 | 174 |
| 35 | 0.10/0.003 | 69.7 | 251 |

[1] See Footnote 11, Table 1.
[2] See Footnote 3, Table 1.
[3] On fiber.
[4] 5 tests per sample.
[5] 4 tests per sample.

TABLE 4
ROPE TEST DATA

| Example | Finish System[1] | Linear Density[2] | Breaking Strength, Lb Dry | Breaking Strength, Lb Wet | Retention, % | Abrasion, Cycles Dry | Abrasion, Cycles Wet |
|---|---|---|---|---|---|---|---|
| 37 | 7 | 6.0 | 9488 | 8730 | 92 | 1303 | 409 |
| 38 | 15 | 5.9 | 9970 | 9575 | 96 | 1363 | 399 |
| 39 | 22 | 6.1 | 9433 | 8863 | 94 | 1411 | 394 |
| 40 (Control) | 1 | — | 9970 | — | — | — | 21 |
| 41 (Comparative) | 36 | — | — | — | — | — | 61 |

[1] Represents example number.
[2] Lbs/100 Ft - converts to kg/100 m when multiplied by 1.488.

TABLE 5
PET SPIN FINISH*

| Components | Parts |
|---|---|
| Refined Coconut Glyceride | 15 |
| Hexadecyl Stearate | 15 |
| POE (4) Lauryl Alcohol | 13 |
| Sodium Petroleum Sulfonate, 60-62% active in mineral oil | 10 |
| POE (20) Ethoxylated Tallow Amine | 5 |
| Sodium Salt of Sulfonated Succinic Acid | 2 |
| Mineral Oil, 40 SSU Viscosity | 40 |
| Total | 100 |

*Applied at 0.2% solids add on.

TABLE 6
PET OVERFINISH DATA

| Example | Formulation[1] | Y/Y Abrasion, Cycles Wet[2] | Y/Y Abrasion, Cycles Dry[3] | Y/M Abrasion % Wet | Finish, % Add On | Finish, % Retention[4] |
|---|---|---|---|---|---|---|
| *42 | Overfinish of Example 2 | 100 | 452 | 85 | 0.52 | 25 |
| *43 | Paraffin wax[5] (melts at 54.4° C.) + polyethylene[6] | 345 | 452 | 95 | 0.48 | 38 |
| 44 | Overfinish of Example 7 | 452 | 452 | 93 | 0.53 | 70 |
| 45 | Overfinish of Example 15 | 452 | 452 | 93 | 0.50 | 95 |
| 46 | Overfinish of Example 22 | 452 | 452 | 85 | 0.47 | 85 |

[1] Applied by kiss roll from 10% solids aqueous emulsions.
[2] 1000 g pretension weight.
[3] 600 g pretension weight.
[4] Footnote 2, Table 1.
[5] Repelotex D, commercially available from Lyndal Chemical.
[6] Discosoft 567, see Table 1.
*Comparative examples.

We claim:

1. A method of producing a wet abrasion resistant cordage from yarn comprising:
   treating the yarn after drawing with an effective amount of an aqueous overfinish composition having an oil portion which comprises about 20 to 80 weight percent of an oxidized polyethylene emulsified with a non-nitrogen nonionic emulsifier and neutralized with an alkali hydroxide; and about 80 to 20 weight percent of a compound selected from the group consisting of a siloxane of the comonomers dimethyl and 3-[(2-aminoethyl)aminopropyl], and an amide melamine wax then forming said cordage.

2. The method of claim 1 wherein said yarn is treated with a sufficient amount of said composition to achieve at least about 0.25 weight percent oxidized polyethylene on the yarn.

3. The method of claim 2 wherein said compound is the siloxane and wherein said yarn is treated with a sufficient amount of said composition to achieve at least about 0.25 weight percent siloxane on the yarn.

4. The method of claim 3 wherein said yarn is polyester.

5. The cordage made according to the method of claim 4.

6. The method of claim 3 wherein said yarn is polyamide.

7. The cordage made according to the method of claim 6.

8. The method of claim 3 wherein said yarn is polyolefin.

9. The cordage made according to the method of claim 8.

10. The method of claim 2 wherein said compound is the amide melamine wax and wherein said yarn is treated with a sufficient amount of said composition to achieve at least about 0.25 weight percent wax on the yarn.

11. The method of claim 10 wherein the amide melamine wax is formed by reacting melamine with a $C_6$ to $C_{36}$ fatty acid to form a hydrophobic amide which is emulsified with paraffin wax using nonionic emulsifiers.

12. The method of claim 11 wherein the melamine is reacted with a $C_{10}$ to $C_{18}$ fatty acid.

13. The method of claim 12 wherein said yarn is polyester.

14. The cordage made according to the method of claim 13.

15. The method of claim 12 wherein said yarn is polyamide.

16. The cordage made according to the method of claim 15.

17. The method of claim 12 wherein said yarn is polyolefin.

18. The cordage made according to the method of claim 17.

19. The method of claim 1 wherein the relative amounts of the oxidized polyethylene and the compound are about the same in said composition.

* * * * *